United States Patent [19]

Strömberg

[11] Patent Number: 4,686,939
[45] Date of Patent: Aug. 18, 1987

[54] FAST FLUIDIZED BED BOILER AND A METHOD OF CONTROLLING SUCH A BOILER

[75] Inventor: Lars Å. Strömberg, Nyköping, Sweden

[73] Assignee: Studsvik Energiteknik AB, Nyköping, Sweden

[21] Appl. No.: 754,988

[22] Filed: Jul. 15, 1985

Related U.S. Application Data

[62] Division of Ser. No. 552,130, filed as PCT SE83/00089, Mar. 15, 1983, published as WO83/03294, Sep. 29, 1983, Pat. No. 4,538,549.

[30] Foreign Application Priority Data

Mar. 15, 1982 [SE] Sweden .......................... 8201632-0

[51] Int. Cl.$^4$ .............................................. B09B 3/00
[52] U.S. Cl. ................................... 122/4 D; 110/245
[58] Field of Search ................. 122/4 D; 431/7; 110/245, 347; 165/104.16

[56] References Cited

U.S. PATENT DOCUMENTS

| | | |
|---|---|---|
| 4,085,707 | 4/1978 | Moss . |
| 4,165,717 | 8/1979 | Reh et al. ........................ 431/7 X |
| 4,259,911 | 4/1981 | Jones . |
| 4,312,919 | 1/1982 | Devanney . |
| 4,325,327 | 4/1982 | Kantesaria et al. . |
| 4,341,515 | 7/1982 | Korenberg . |
| 4,349,969 | 9/1982 | Stewart et al. . |
| 4,351,275 | 9/1982 | Bhojwani et al. . |
| 4,359,968 | 11/1982 | Stewart .............................. 122/4 D |
| 4,445,844 | 5/1984 | Matthews . |
| 4,462,341 | 7/1984 | Strohmeyer, Jr. ................. 122/4 D |
| 4,469,050 | 9/1984 | Korenberg . |

OTHER PUBLICATIONS

"Flow Regimes in Vertical Gas-Solid Contact Systems," J. Yerushalmi et al, *The American Inst. of Chem. Engrs.*, 1978, No. 176, vol. 74, *Chemical Engineers Handbook*, 1984, pp. 20-58–20-61, 20-78, 20-82–20-83.

Primary Examiner—Edward G. Favors
Attorney, Agent, or Firm—Burns, Doane, Swecker & Mathis

[57] ABSTRACT

A completely cooled fast fluidized bed boiler comprises a reactor (4) having a bottom section (3), an integrated primary non-centrifugal mechanical particle separator (5), a gas pass (7) containing convective heat exchangers (10), and means (6,8,9) for controllably recirculating separated particles into the reactor bottom section (3). Reactor (4), separator (5) and gas pass (7) are built as an integrated unit within one and the same cooling system. The boiler is controlled by maintaining the bed temperature substantially constant or within a relatively narrow temperature interval by regulating the recirculation rate dependent on boiler load. For regulating the recirculation rate a non-mechanical valve, preferably a so-called L-valve (8), is used.

4 Claims, 6 Drawing Figures

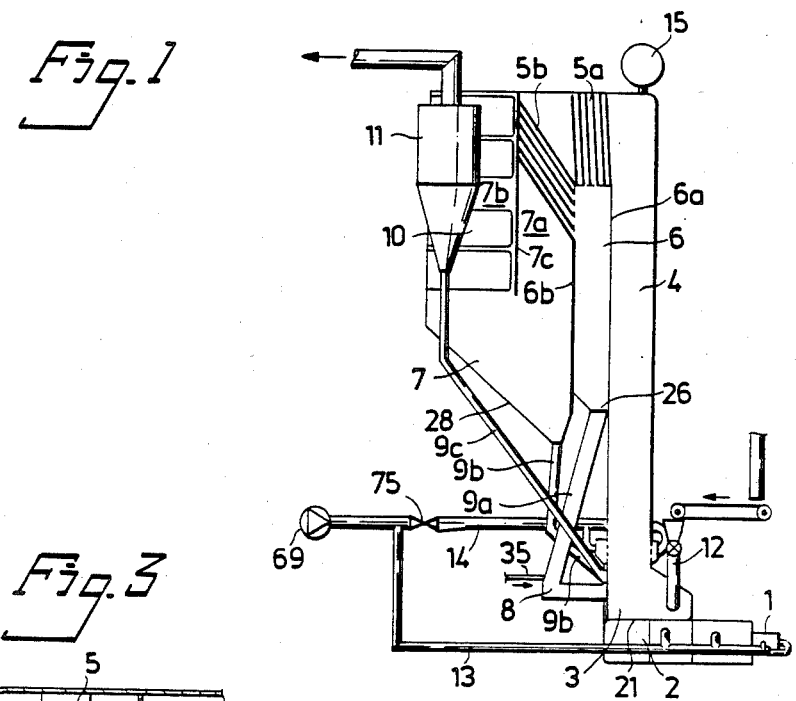
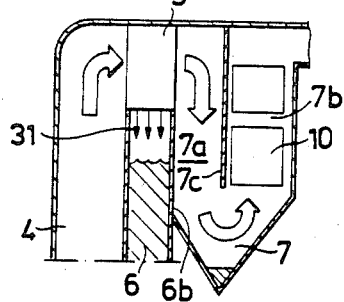
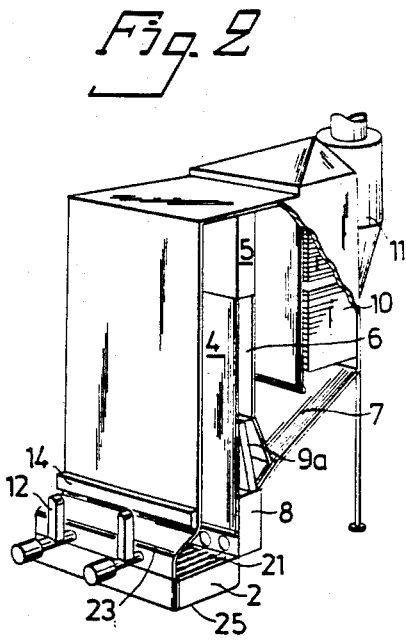
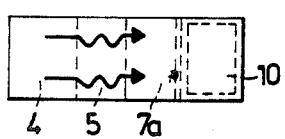

FAST FLUIDIZED BED BOILER AND A METHOD OF CONTROLLING SUCH A BOILER

This application is a division of application Ser. No. 552,130, filed Oct. 14, 1983, U.S. Pat. No. 4,538,549.

FIELD OF INVENTION

This invention relates to fast fluidized bed boilers. More particularly, the invention relates to novel and improved design and control features of such boilers.

TECHNOLOGICAL BACKGROUND

Fluidized bed boilers recently have become of great interest as a very attractive means of generating heat. Many bubbling or turbulent fluidized bed boilers have proved to operate very satisfactory.

However, when it comes to fast fluidized bed boilers, serious problems have to be solved, particularly with regard to heat transfer, particle separation and control of operation.

Thus, the common use of cyclone particle separators means that the boiler has to be built from separated parts and cooling systems. Also, cyclone particle separators have very huge dimensions, at least at high boiler powers, giving serious lay-out problems.

Also, existing power control systems which primarily control fuel feed as the load varies, tend to be inacurate and to give so-called over shoot.

It is previously known that ordinary fluidized bed boilers can be provided with other particle separators than cyclone particle separators; cf. for instance GB A No. 2 046 886 which discloses a fluidized bed boiler having a baffle type separator located in the effluent gas pass. The amount of separated material is of course very low.

However, with regard to fast fluidized bed boilers, those skilled in the art have been convinced that particle separators of the cyclone type are necessary in view of the very large amount of particles to be separated and the high velocity of the gas-particle mixture.

OBJECT AND SUMMARY OF INVENTION

It is an object of this invention to provide a novel and improved fast fluidized bed system whereby the above-mentioned problems are overcome and additional advantages are obtained, as will be apparent from the following.

The object of the invention is achieved by a fast fluidized bed boiler, as well as by a method of controlling such a boiler, having the novel features defined in the accompanying claims.

According to a first important aspect of the invention, the boiler is designed as a completely cooled and integrated unit, including the primary particle separator, being a mechanical separator of a labyrinth type and not of the cyclone type.

Thus, it has been found that a mechanical primary particle separator of the labyrinth type can handle the very large amount of circulating material, while simultaneously being integrated both into a compact boiler structure and into one and the same cooling system.

According to a second important aspect of the invention, separated material is recirculated via a non-mechanical control valve, preferably a so-called L-valve, thereby enabling an accurately controlled recirculation rate. In a preferred embodiment, separated material is collected in a material or particle storage prior to being recirculated into the reactor via said control valve. The storage can be integrated with the boiler.

According to a third important aspect of the invention, the boiler operation is controlled by maintaining the reactor bed temperature essentially constant, or within a relatively narrow temperature interval, by regulating the recirculation rate dependent on the boiler load.

The above-mentioned aspects, as well as further important features of the invention, will be more fully understood by the following description of presently preferred but nonetheless illustrative embodiments of the invention, when taken in connection with the accompanying drawings.

BRIEF DESCRIPTION OF THE DRAWINGS

FIG. 1 is a schematic view of a preferred embodiment of a fast fluidized bed boiler in accordance with the invention.

FIG. 2 is a schematic perspective view of a fast fluidized bed boiler, generally in accordance with FIG. 1, further illustrating the novel design of the boiler.

FIG. 3 and 4 are very schematic side and top views, respectively, of the upper part of a fast fluidized bed boiler according to the invention, illustrating the general operation of an integrated mechanical labyrinth type particle separator.

DETAILED DESCRIPTION OF EMBODIMENTS

General Design and Operation

Figure 5:
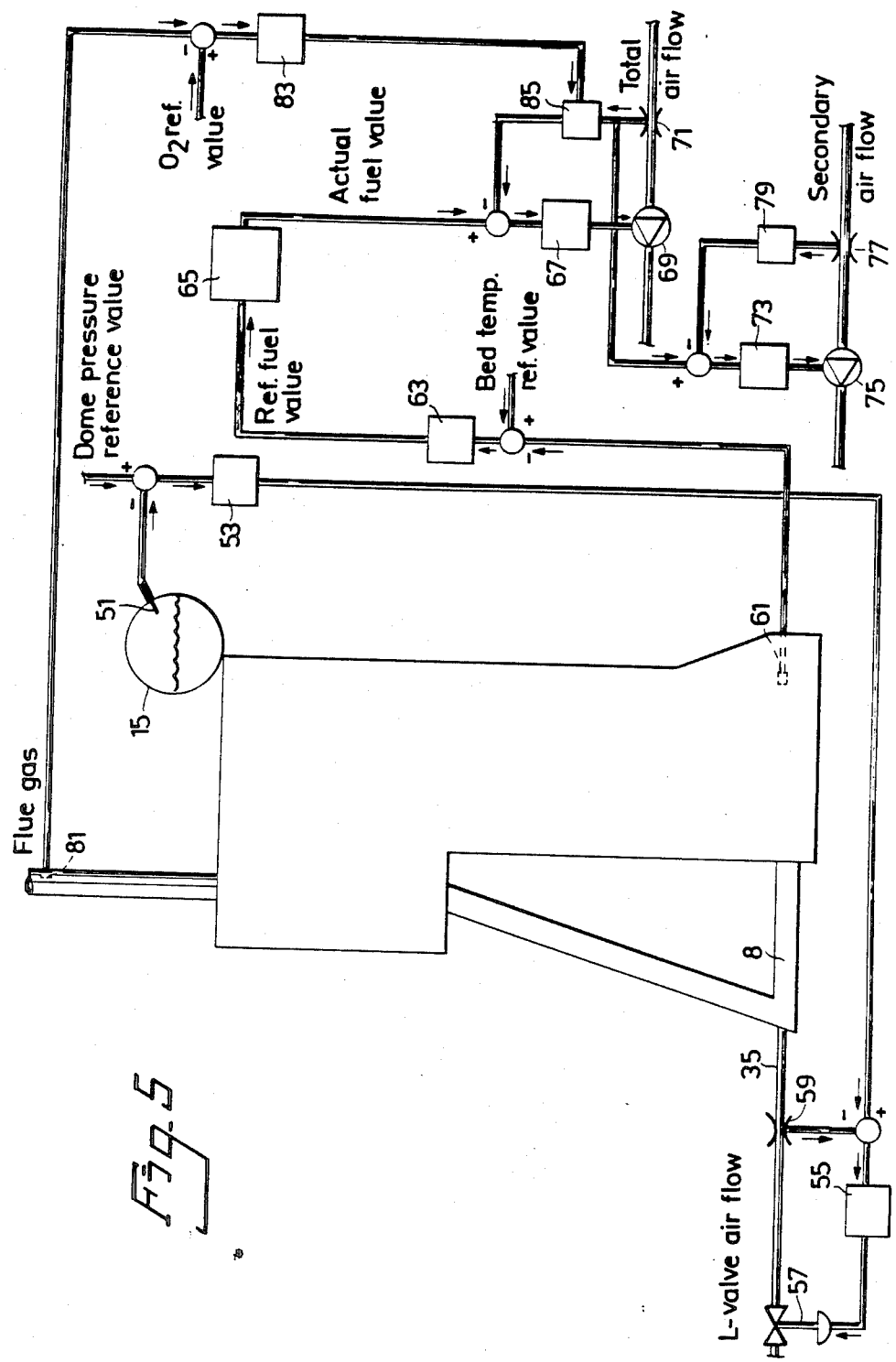
FIG. 5 is a schematic block diagram illustrating a first embodiment of a novel method of controlling the operation of a fast fluidized bed boiler in accordance with the invention.

Referring to FIGS. 1-4, the boiler disclosed therein comprises the following main parts:

1. Startup burner
2. Air plenum
3. Bottom section
4. Reactor
5a, 5b. Primary particle separator
6. Particle storage
7. U-pass, settling chamber, radiation heat exchanger
8. L-valve
9. Stand pipes
10. Convective heat exchanger
11. Secondary cyclone separator
12. Fuel feed
13. Primary air supply
14. Secondary air supply
15. Dome The boiler is built according to common boiler manufacturers standards. The unit is completely cooled, with standard membrane walls having water tubes. The particle separator, particle recirculation line and convective heat transfer parts are integrated with the boiler body. The boiler is designed as a "slice" or module, making it possible to increase power by connecting several modules in parallel, with or without cooled partitions.

The main combustion takes place in reactor 4 into which gases and bed material enter from bottom section 3. The bottom section is mainly a mixing and precombustion chamber. Primary air is introduced through bottom nozzles into the bottom section 3, while secondary air is supplied at the transition between the bottom section and the reactor. Fuel is introduced in the bottom section. Particles are mainly separated in the particle separator. Bed ash is withdrawn from particle storage 6. New bed material is fed into the particle storage as well. Additives come with the fuel, typically coal.

The startup burner is oil fired, and burner air is primary air to the bed during operation.

The boiler is preferably connected to a heat exchanger for district heating.

The bed is designed to obtain a typical power distribution between the different cooling surfaces as follows:

Bottom section ~ 10%
Reactor ~ 45%
Particle storage ~ 3%
Convection parts ~ 30%

Particles leaving reactor 4 are separated in three stages and circulated, before final clean up in a bag filter (not shown). The first stage is the integrated particle trap 5. The second stage is a settling chamber 7 combined with a change of gas direction below the convective part. The third stage is an ordinary tangential cyclone 11 following the convection pass. Recirculation from separator 5 is provided via particle storage 6, into which the separator feeds the particles directly. Settling chamber 7 and cyclone 11 feed the particles via stand pipes 9 directly into bottom section 3. The recirculation rate from particle storage 6 is controlled by means of L-valves 8. The recirculation rates from settling chamber 7 and cyclone 11 need not be controlled.

Bottom section 3 is enlarged to provide lower fluidizing velocities, and thus longer retention times. However, the velocity is high enough to provide a good mixing of bed material and fuel. The bottom section consists of membrane tubes as well. The bottom section is merely a widening of the reactor, and ends with the secondary air inlets.

Secondary air is introduced through holes in the membrane walls of reactor 4.

Generally bottom section 3 should be as low and wide as possible to give low pressure drop and good mixing and long retention times. The height of reactor 4 is non-critical and should only be as high as wanted for any conversion quotia for any specific fuel.

Reactor

A typical reactor of a 2.5 MW boiler module is 6 m high and 0.7×0.7 m in cross section. The walls are welded finned vertical tubes forming membrane walls.

Immediately at the entrance secondary air is introduced. The air inlets are actually the spacing between the tubes, with fins removed. These openings are provided over the entire width of the front wall and back wall. Two sets of openings are made to reduce pressure drop when the bed is operated in the cold mode. During warm operation, one set of openings is used. The air velocity is approximately 20 m/s in the slots.

The walls are absolutely smooth in the vertical direction to avoid erosion on the tubes. Cooling is provided by the membrane walls.

The height of the reactor is chosen to provide a reasonable burnout of the char particles. Since total burnout is not achievable, there is no reason to make the reactor too high. Typically, the width is chosen to give 2.5 MW output at ~8 m/s with 30% excess air.

Mean gas speed is between 5 and 10 m/s, typically about 8 m/s. Mean density of the gas-particle mixture typically is from 5 to 100 kg/m$^3$. Mean particle size typically is 0.1–0.5 mm.

Pressure drop in the reactor is almost only depending on the mean density of the particle mixture and is typically 3000 Pa.

The top of the reactor, which is the entrance to particle separator 5 is quite simply a 90 degree bend, rounded to give some smoothening of the change of direction. The reactor walls continuously goes on into the particle separator and bottom section walls.

BOTTOM SECTION

As stated above, bottom section 3 is actually only a widening of the reactor. The horizontal area is twice the cross section of reactor 4. The height is determined by the secondary air inlet and can be varied between 0.8 m and 1.2 m. The widening is directed by the desire to maximize the retention time for particles and still keep the vertical height as low as possible. The bottom section contributes to the pressure drop significantly. Pressure drop for the bottom section typically varies from 15 kPa to 7 kPa.

The distributor or bottom plate 21 is formed of finned tubes and is only a prolonged part of the front wall 23. These wall tubes continue further and form back wall and floor 25 of air plenum 2. Thus air plenum 2 is cooled and can sustain a luminous flame from a startup burner 1.

Bottom section 3 serves several purposes such as mixing chamber, sub-stoichiometric combustion/pyrolysis area, dynamic dampener and low load combustion part.

All recirculation lines 9 enter below the secondary air inlet in the back wall. L-valves 8 and stand pipes 9 from settling chamber 7 and cyclone 11 extend through the wall and end flush to the wall. Fuel is fed into bottom section 3, which is advantageous for mixing, and residence time causes. Also the NO$_x$ reduction and SO$_x$ reduction abilities are favoured by this design. The back pressure on the fuel line is though the highest anywhere in the system. Fuel can be fed by a screw feeder through the wall.

Air distribution into the bottom section is provided by air nozzles welded to the tube fins, with a 100 mm spacing. The nozzles are formed of a short tube and a head. The head is cylindrical with six holes drilled on the circumference. The holes are angled downwards 15 degrees. preventing back leaking of bed material. The pressure drop is obtained in the holding tube, not in the holes, to minimize jet momentum of the air.

PRIMARY PARTICLE SEPARATOR

Particle separator 5 is located at the transition between the top of reactor 4 and the first part of the first vertical pass 7a into settling chamber 7. The separator includes two sections, the first one placed vertically above particle storage 6 and the second one placed in said first part of vertical pass 7a. Separator 5a consists of vertically extending staggered U-beams and separator 5b consists of similar U-beams extending inclined relative to the vertical direction. The U-s are open towards the circulating gas-particle mixture. Particle separator 5 separates the bed material and combustion gas in a first step. The efficiency of the separator depends on gas velocity and particle load. High particle loading and low velocities increases efficiency. Usually efficiency has proved to be better than 95%.

The separated particles are fed directly into particle storage 6, whereas the gas continues to the vertical radiation and conduction pass and the settling chamber 7.

The particle separator operates as a particle trap or actually a labyrinth. The U-beams, positioned in a staggered pattern provide the trapping. This makes the gas flow in serpent like stream lines while particles tend to go straight and into the vertically positioned or generally downwards directed U-beams. When the particles make impact on the bottom of the U they either bounce back and come back or just fall down along the beam which ends in a hole in the roof or back wall of the particle storage.

The above-mentioned separation effect is illustrated in FIGS. 3 and 4, wherein arrows 31 indicate separated material falling into particle storage 6. Particle separator 5 includes separator 5a and separator 5b, with particles from each separator being combined to form separated material 31 which falls out into the common storage area 6.

This type of particle separator is truly two dimensional, which is necessary for enabling scaling up or down and still keeping the whole separator completely integrated with the totally cooled boiler body. Further this labyrinth type of separator has proved to be most suitable to handle the extremely high particle loadings (such as 100 kg/m$^3$) of a fast fluidized bed.

The particle separator beams are not cooled, and they are only fixed lengthwise at their top end, suspended in the cooled boiler roof and the cooled wall 7c between the down- and upgoing passes 7a, 7b, respectively. The other end of each beam is loosely fixed just by passing through corresponding holes into particle storage 6.

The U-beams above the particle storage roof are slightly angled to the vertical direction, while the U-beams in downward pass 7a typically have a 60 degree angle to the horizontal direction. While this structure describes a particularly preferred embodiment, in general it is preferred that the particles be separated in at least two angles, i.e., two dimensions relative to a horizontal plane.

Finally, with regard to the mechanical primary particle separator it is to be emphasized that the wording "labyrinth" is to be interpreted in a broad and general way and, thus, is to include also so-called shutter type separators, for instance, or in other words gravity and momentum separation configurations, that is, non-centrifugal configurations.

PARTICLE STORAGE

Particle storage 6 is placed between reactor 4 and downward pass 7a. The common walls 6a,6b are cooled. The cross section is approximately 0.5×0.7 m. The storage volume is determined by a suitable drain, which is the ash withdrawal component. The particles enter the storage from the roof and from the upper one third part of the back wall. Particles leave the storage through exit holes 26 to the stand pipes. These holes do not cover more than half the floor. The rest is a distributor plate for a fluidizing agent, in this case air.

The storage can thus be fluidized. The amount of air necessary is only 0.2% of the main air supply.

The bed in the storage does not have to be fluidized for any other reasons than providing smooth feeding to the ash line (not shown) and to the stand pipes leading to L-valves 8.

The height of the storage bed is determined by the pressure drop in the bottom section and reactor. The volume is determined by the need for variations of material content in the reactor. In the embodiment disclosed this gives a typical total particle content in the boiler of approximately 1 metric tonne and a stored mass of approximately 500 kg.

For startup and renewing of bed material a simple hole having a valve can be provided in the wall of the storage.

Settling Chamber and Radiative Heat Exchanger

The gases passing through particle separator 5 enter a downward "empty" pass 7a. This pass is ended by a conical bottom 28, where the gases pass an U-shaped bend into upward pass 7b. The volume at the conical bottom acts as a settling chamber, where some additional particles are separated.

The downward vertical pass 7a thus does not include any inserted heat exchangers. The walls are cooled and quite dust loaded gas passes which implies that there is both radiative and convective heat transfer to the walls in approximately equal proportions.

The conical bottom can be uncooled partially. Particles are drained through a simple hole into a stand pipe 9a directly into bottom section 3.

Convective Heat Exchanger

Convective heat exchanger 10 is located in the upward pass 7b of the U-formed exhaust boiler part. The walls are incorporated in the cooling system. The heat exchanger includes a "flag" type of tubing, with no widening of the spacing but with in line pattern instead of a staggered pattern.

L-Valves and Stand Pipes

The particles from particle storage 6, settling chamber 7 and cyclone 11 are reintroduced into bottom section 3 via stand pipes 9. Usually these pipes are not separately fluidized, but still operate in a fluidized mode due to the operating conditions of the boiler.

The flow from particle storage 6 is controlled by non-mechanical valves, so-called L-valves. These valves are control valves, which can be shut off completely. Flow rate is controlled by an external air supply just above the sharp bend of the L, as indicated at 35. L-valves are developed for granular material flow control in industry. However, they have proved to be most suitable in this application, with high temperature material.

The controllability range is approximately 1 to 10. During startup of the boiler there is need for a recirculated flow rate of 1 to 5% of the flow rate during operation. Therefore a separate startup valve suitably is installed in addition to the two full range valves used. The cross-section of the full load stand pipes and L-valves is square, while the small startup valve is circular.

The three valves each have a separate air supply 35 and thus can be independently controlled. The horizontal parts of the valves are approximately 4 times the stand pipe diameter to enable an almost complete shut off, maintaining the full load capacity. The pressure drop backwards through the L-valve is somewhat smaller than the total length of the horizontal and vertical parts, multiplied by the bed material density.

With regard to the design of L-valves, reference is made to, for instance, "Solids flow control using a non-mechanical L-valve" by T. M. Knowton and I. Hirsan, Institute of Gas Technology, Chicago, U.S. This is a paper presented at the Ninth Synthetic Pipeline Gas Symposium, Chicago, Ill., Oct 31 - Nov 2, 1977, the contents of this papper hereby being incorporated by reference.

It should be clear that the wording "so-called L-valve" includes modifications such as J-valves giving the same controllability by using concurrent fluidization.

The stand pipes 9b,9c from settling chamber 7 and cyclone 11 have an angle to the horizon exceeding about 60 degrees. To avoid back flow of gas it is important that the pipes end below the secondary air inlet, where a turbulent bed exists. This means that a plug of bed material always builds up in the stand pipe to balance the pressure difference between the bottom section and the inlet of the stand pipe. Thus the stand pipe length projected vertically must exceed the height corresponding to the bottom section pressure. Then the back flow of gas through the stand pipes cannot exceed the flow necessary for minimum fluidization, which is very small compared to the main gas flow.

The particle mass flow from cyclone 11 and settling chamber 7 is thus uncontrolled but selfadjusting to keep the material level at the one directed by the pressure drop in the rest of the system.

All stand pipes and L-valves are uncooled and insulated.

The construction of the stand pipes may differ widely, but the basic principle must be kept: high angle and smooth tubing with bottom end connected to a dense bed region.

Cyclone

Cyclone 11 is a standard cyclone for high dust loadings. It operates at temperatures below 250° C. and is thus a non-critical component. It should have a high efficiency just to keep the dust loading low for subsequent bag filter (not shown).

The cyclone feed particles directly back into the stand pipe and gas leaves directly to the conventional bag house.

Ash Withdrawal System

Ash and sorbents are continuously enriched in the bed. The mineral matter have to be removed continuously. The carbon concentration in the bed material is in the order of 1%. Depending on conversion quotia the concentration varies, but all the time the concentration is lowest in the recirculation lines. The bed material is thus suitably drained from the particle storage.

Control of Operation

The heat transfer in the reactor is variable and controllable. The heat transfer in the rest of the system varies according to common rules.

The coal concentration in the bed material varies and depends on:

Particle size
Oxygen concentration
Bed temperatures.

This implies that for every load and excess air ratio there exists a given carbon concentration. If the temperature is increased this leads to a lower "equilibrium" concentration. If different fuels are fired the balance of the cooling effect between the reactor and convective parts is altered if the bed temperature is remained at 850° C. for optimum combustion results. If the load changes, the temperatures of the cooling water will change. This does not affect the cooling effect significantly.

Conventionally, a load change is allowed to change the fuel feed, which in its turn affects the carbon concentration in the bed initially. This will give a change in generated heat by chemical reaction, and of course a change in temperature of the bed. This leads to an alteration of the cooling effect.

However, an increase of the fuel flow means that the carbon concentration, liberated heat and temperature also increase. With an elevated temperature, however, an even lower carbon concentration than the initial is called upon for equilibrium. This leads to a typical "over shot" in control.

The classical way of control where boiler load controls the fuel feed and air flow thus does not work very well with fast fluidized beds. The link connecting chemical reaction and energy production is missing, giving the draw backs of over shoot and concurrent initial reaction.

Now, actually it is not the carbon concentration in the bed which controls the amount of chemical reaction, but the mass content in the combustion zone. If the circulation flow rate is increased, this automatically leads to increased density in the reactor. Increased density means also increased mass of carbon in the reactor.

An increase of circulation rate thus leads to both a higher heat flux to the walls and a higher heat production, until the carbon is consumed. This phenomenon is rapid and much faster than the way of increasing carbon concentration by increasing fuel feed.

Consequently, in accordance with the invention it is suggested that the recirculation rate should be included in the control system, bearing in mind that the fast fluidized bed does not react as any other boiler type due to the accumulated carbon in the bed material and the change in heat transfer with particle recirculation mass flux.

Thus, the novel control method in accordance with the invention means that the temperature of the bed material is maintained essentially constant, or within a relatively narrow temperature interval, by regulating the recirculation rate dependent on the boiler load. Typically, the bed temperature is maintained within a 50° C. interval, the interval optionally being set within an operating temperature interval of from about 700° C. to about 900° C.

Two preferred embodiments of the method involving recirculation rate regulation are envisaged.

The first embodiment means that the boiler load regulates the recirculation rate or flow, effecting the bed temperature, while bed temperature regulates the supply of fuel and air to the reactor.

The second embodiment means that the boiler load regulates the supply of fuel and air to the reactor, while the bed temperature regulates the recirculation rate or flow.

This novel method gives almost instantaneous response to a load variation, and the problems with the missing link, the heat transfer and over shoot and negative response are eliminated.

The regulation of the supply of fuel and air suitably means that primarily the fuel flow is controlled, the air flow being controlled in response to the fuel flow. However, the opposite way is also possible.

As should be realized, the carbon mass content, temperature and oxygen concentration in the reactor determine the amount of fuel combusted. Therefore, if the air flow is controlled only by the fuel flow, a fluctuating excess air ratio will result. Thus, the oxygen concentration also should control the air flow.

Figure 6:
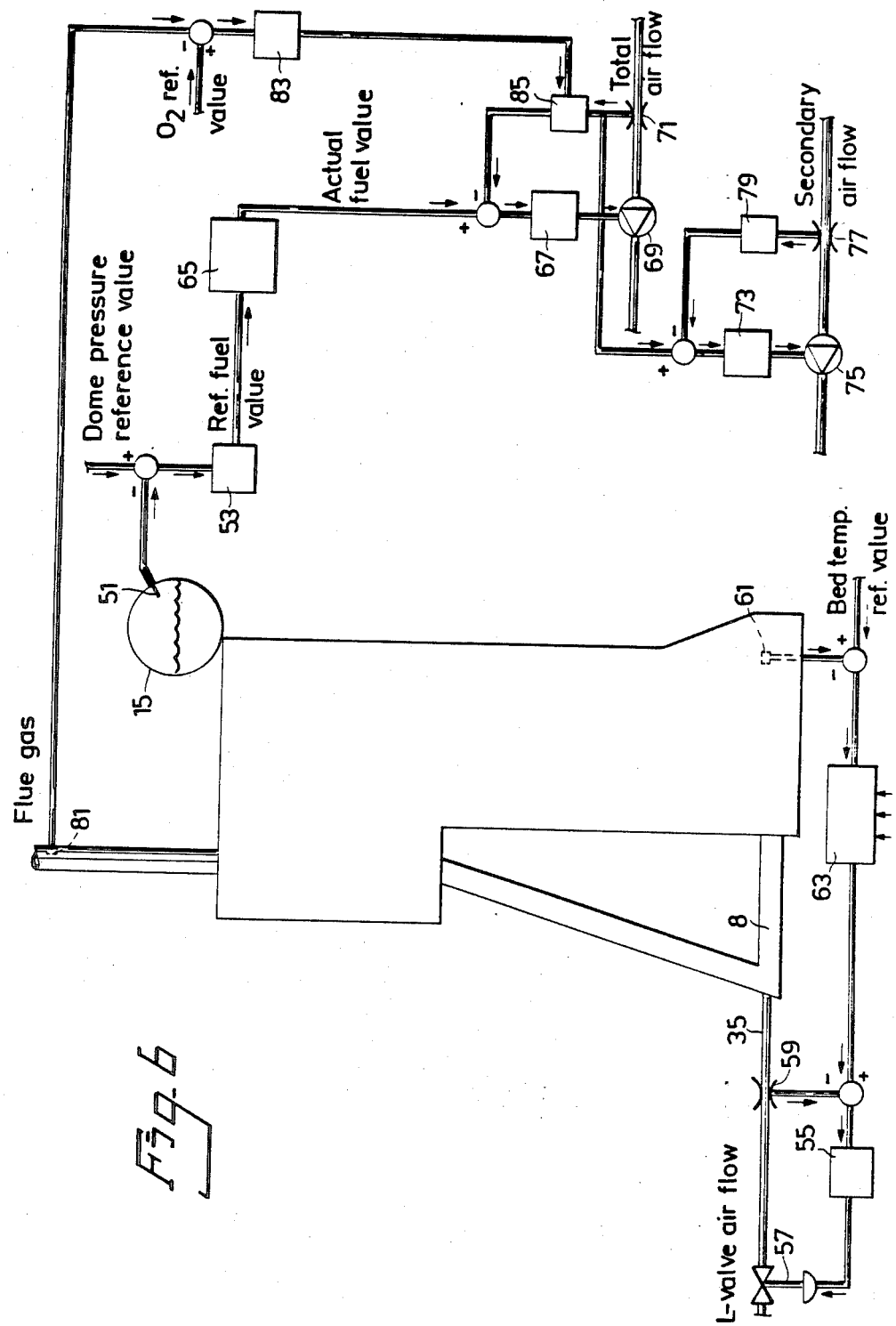
FIG. 6 is a schematic block diagram illustrating a second embodiment of a novel method of controlling the operation of a fast fluidized bed boiler in accordance with the invention.

The above-indicated two embodiments of the novel method according to the invention are illustrated on FIGS. 5 and 6, respectively.

The two control systems of FIGS. 5 and 6 both comprise the following main components: Dome pressure sensor 51; dome pressure regulator 53; L-valve air flow regulator 55; L-valve air flow control valve 57; L-valve air flow sensor 59; bed temperature sensor 61; bed temperature regulator 63; fuel flow regulator 65; total air flow regulator 67; total air flow control means 69; total air flow sensor 71; secondary air flow regulator 73; secondary air flow control means 75; secondary air flow sensor 77; secondary air ratio adjuster 79; $O_2$-sensor 81; $O_2$-regulator 83; and fuel-total air flow-ratio adjuster 85. All regulators are of PID type.

Referring now to FIG. 5, the power need is measured by dome pressure sensor 57. An increasing dome pressure indicates that the combustion power exceeds the power consumed by the load and vice versa.

The difference between the dome pressure actual value and the dome pressure reference value (set manually) is the input to dome pressure regulator 53, the output of which controls the recirculation rate by being one input (reference value) to L-valve air flow regulator 55, the other input being the L-valve air flow actual value received from sensor 59. Regulator 55 controls valve 57 and thus the L-valve air flow.

Thus the dome pressure controls the recirculation such that instantaneous changes of the power need are met by changes of the particle density of the reactor. Increased particle density means improved heat transfer which in its turn means that the bed temperature decreases, requesting increased fuel and air flow. Decreasing particle density gives the opposite effect.

The bed temperature is measured by means of sensor 61, thus giving an actual bed temperature value as one input to bed temperature regulator 63, the other input being a reference value set manually. The output of regulator 63 is the fuel reference value and is fed to fuel regulator 65. The fuel system is a separate system providing a constant fuel flow in accordance with the fuel reference value.

The output of regulator 65, that is, the actual fuel flow value, controls the air flow and thus is one input to total air flow regulator 67. The air flow is controlled such that a suitable ration between air and fuel is obtained. The other input to regulator 67 is obtained from total air flow sensor 71, via $O_2$adjuster 85. Thus, said ratio is adjusted dependent on the $O_2$content of the flue gases. The $O_2$content is measured by means of sensor 81, giving one input to $O_2$regulator 82, the other input to regulator 83 being a manually set $O_2$reference value. The output of $O_2$regulator 83 controls adjuster 85. Regulator 67 controls the total air flow by means of a suitable flow control means 69.

The total air flow includes the primary air flow and the secondary air flow. The secondary air flow is controlled by secondary air flow regulator 73 operating on a suitable flow control means 75. The reference input to regulator 73 is the actual total air flow value obtained from sensor 71, the other input being obtained from actual secondary air flow sensor 77 via manual adjuster 79. Adjuster 79 makes it possible to set a desired ratio between secondary air and total air.

Referring to FIG. 6, the system shown differs from that of FIG. 5 in two respects. Firstly, the output of dome pressure regulator 53 is the fuel flow reference value instead of the L-valve air flow reference value. Secondly, the output of bed temperature regulator 63 is the L-valve air flow reference value instead of fuel flow reference value. Also, bed temperature regulator 63 is adaptive and has externally controlled parameters, for instance dependent on boiler power. The total and secondary air flow control is the same.

Finally, it is to be emphasized that a control method in accordance with the invention means that various fuels can be fired without any changes being necessary with regard to the boiler or fuel supply means. In fact, operational effects due to fuel substitution quite easily can be handled by regulating the recirculation rate.

While certain preferred embodiments of the invention have been described, it should be apparent that various modifications, changes and substitutions are possible within the spirit and the scope of invention as given by a broad interpretation of the appended claims.

What is claimed is:

1. In a process for operating a fast fluidized bed boiler including a reactor, means for establishing a fluidized bed within the reactor, a primary particle separator connected to the reactor for receiving a gas-particle mixture from the reactor, the improvement comprising mechanically separating particles in the primary particle separator from the gas-particle mixture in a non-centrifugal mechanical separator of the general labyrinth type wherein the particles are separated in two dimensions and recirculating separated particles to the reactor through a path external of the reactor.

2. A process for operating a fast fluidized bed boiler comprising the steps of establishing a fast fluidized bed in a reactor, conveying material through the fast fluidized bed in the reactor, separating particles in a non-centrifugal mechanical primary particle separator of the general labyrinth type wherein the particles are separated in two dimensions and recirculating the separated particles externally of the reactor back to the reactor.

3. The process of claim 1, further comprising separating particles in a secondary particle separator of the settling chamber type subsequent to separating particles in the primary particle separator.

4. The process of claim 2, further comprising separating particles in a secondary particle separator of the settling chamber type subsequent to separating particles in the primary particle separator.

* * * * *